US005646928A

United States Patent [19]
Wu et al.

[11] Patent Number: 5,646,928
[45] Date of Patent: Jul. 8, 1997

[54] FREE-SPACE INTEGRATED MICRO-PICKUP HEAD FOR OPTICAL DATA STORAGE AND A MICRO-OPTICAL BENCH

[75] Inventors: Ming C. Wu, Pacific Palisades; Lih-Yuan Lin, Los Angeles, both of Calif.

[73] Assignee: The Regents of the University of California, Oakland, Calif.

[21] Appl. No.: 493,240

[22] Filed: Jun. 22, 1995

[51] Int. Cl.$^6$ ............................ G11B 7/00; G02B 6/12
[52] U.S. Cl. ..................... 369/112; 369/122; 359/362; 385/14
[58] Field of Search ...................... 369/122, 112; 359/642, 900, 362; 427/162, 164, 165, 167; 437/51, 60, 80, 225, 915, 924; 257/82, 99, 432; 385/14

[56] References Cited

U.S. PATENT DOCUMENTS

| | | | |
|---|---|---|---|
| 4,789,214 | 12/1988 | Vihelmsson et al. | 427/162 |
| 4,885,732 | 12/1989 | Sunagawa et al. | 369/44.23 |
| 5,043,964 | 8/1991 | Suzuki | 369/44.11 |
| 5,074,646 | 12/1991 | Huang et al. | 359/572 |
| 5,148,319 | 9/1992 | Gratrix et al. | 359/642 |
| 5,293,367 | 3/1994 | Kadowaki et al. | 369/44.37 |

FOREIGN PATENT DOCUMENTS

| | | |
|---|---|---|
| 0597202 | 5/1994 | European Pat. Off. . |
| 5217836 | 8/1993 | Japan . |

OTHER PUBLICATIONS

C.S.E. Miller, "Integrated Optics: An Introduction," Bell Systems Technology Journal, vol. 48, No. 7 pp. 2059–2068 (Sep. 1996).
H. Nishihara et al.,"Optical Integrated Circuits," McGraw Hill 1985.
T. Tamin, "Guided Wave Optoelectronics," Springer–Verlag (1990).
K.E. Petersen, "Silicon as a Mechanical Material," Proc. IEEE, vol. 70, No. 5, at 420–57 (1982).
L.J. Hornbeck, "Deformable–Mirror Spatial Light Modulators," Proc. SPIE, vol. 1150, pp. 86–102 (1990).
M.T. Ching et al., "Microfabricated Optical Chopper," Proc. SPIE, vol. 1992 at 40–46 (1993).
K.S.J. Pister et al., "Microfabricated Hinges," Sensors and Actuators A, vol. 33, at 249–56 (1992).
T. Shiono et al., "Planar–Optic–Disk Pickup with Diffractive Microoptics," Applied Optics, vol. 33, No. 31 at 7350–7355, (Nov. 1994).
L.Y. Lin et al., "Three–Dimensional micro–Fresnel optical elements fabricated by micromaching technique," Electronics Letters vol. 30 No. 5 pp. 448–449 (3 Mar. 1994).
Wu et al., "Micromachined Free–Space Integrated Optics," Proc. SPIE vol. 2291, pp. 40–51 (1994).
Katayama et al., "Compact Optical Head Mobile Integrated with Chip Elements for Magneto–Optical Disks," SPIE vol. 2338, Optical Storage Data, pp. 268–275 (1994).
Micro–Machined Three–Dimensional Micro–Optics for Integrated Free–Space Optical System, by Lin et al., IEEE Photonics Tech Lett, vol. 6, No. 12 pp. 1445–1447 (1994).
"Microphotonic Device and Systems Research," BSAC News, Berkeley Sensor & Actuator Center, vol. 8, No. 2 (1994).
"7–9 February 1995 TI Demonstrates DMD Disply System," SPIE.

*Primary Examiner*—Georgia Y. Epps
*Assistant Examiner*—Kim-Kwok Chu
*Attorney, Agent, or Firm*—Daniel L. Dawes

[57] ABSTRACT

A monolithically integrated optical disk pickup head is comprised of three-dimensional collimating focusing lenses, a beam splitter and 45-degree reflectors that define an optical axis in free-space using surface micromachining technology to fabricate hinged vertical optical structures.

21 Claims, 3 Drawing Sheets

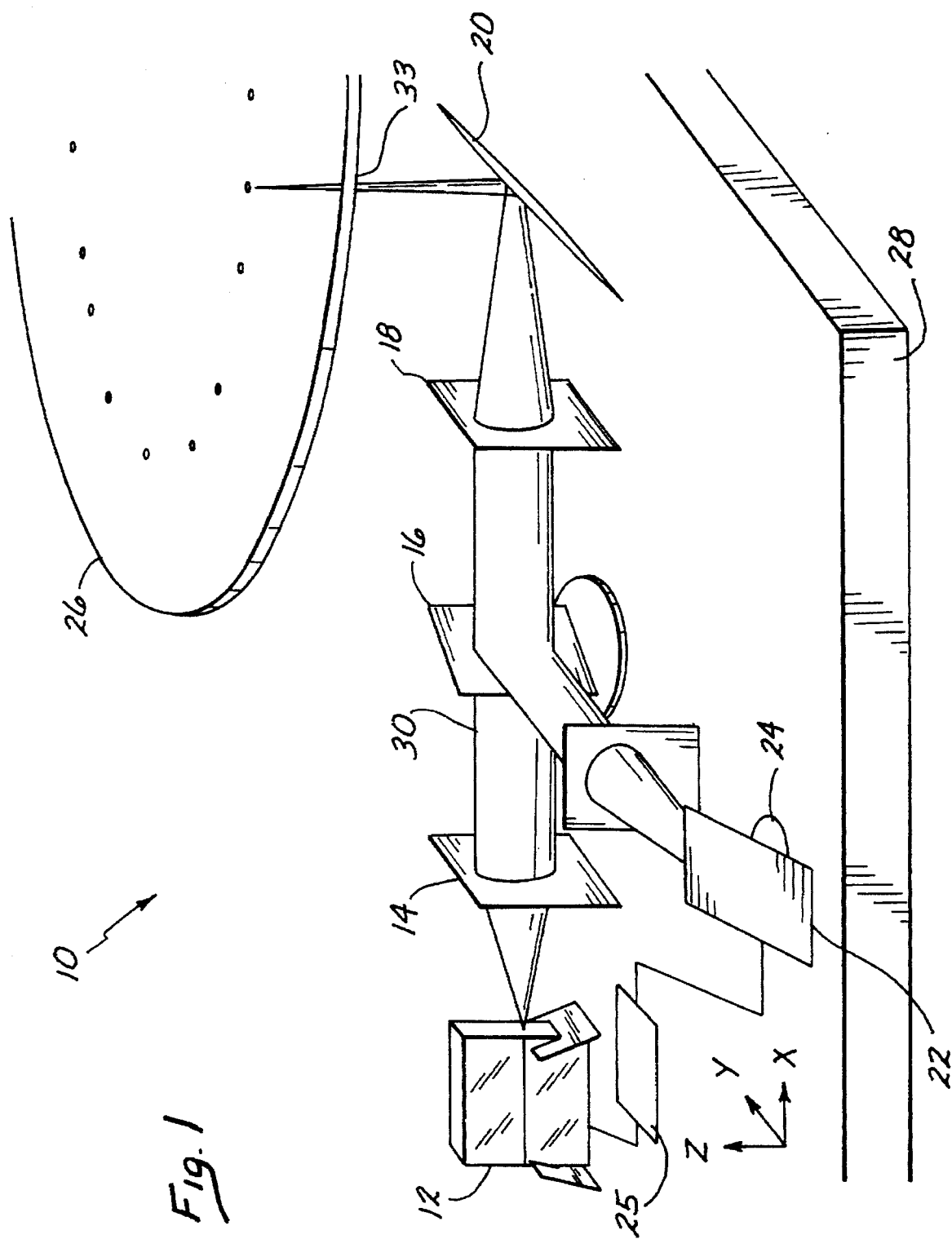

FREE-SPACE INTEGRATED MICRO-PICKUP HEAD FOR OPTICAL DATA STORAGE AND A MICRO-OPTICAL BENCH

BACKGROUND OF THE INVENTION

1. Field of the Invention

The invention relates to the field of micro-optical circuits fabricated by micromachining techniques, and in particular, to a free-space integrated optical pickup head for optical data storage.

2. Description of the Prior Art

Integrated optics has been an active research area since it was proposed first in 1969, C. S. E. Miller, "*Integrated Optics: An Introduction*," Bell Systems Technology Journal, Vol. 48, No. 7, pages 2059–68 (1969). Most of the research efforts in integrated optics has been on guided wave systems. See, for example, H. Nishihara et al., "*Optical Integrated Circuits*," McGraw Hill 1985; and T. Tamir, "*Guided Wave Optoelectronics*," Springer-Verlag (1990). Free-space optics offers many unique advantages that cannot be achieved in guided wave devices. For example, free-space optics allow three-dimensional optical interconnections that could significantly improve the communication bottlenecks in very large semiconductor integrated systems. Much higher spatial bandwidth can also be achieved in free-space optics as opposed to guided wave devices. It is also possible to perform sophisticated optical information processing, such as a Fourier transforms, in a free-space system using lenses.

However, most of the present free-space optical systems are comprised of bulk optical elements or multiple plane micro-lens arrays that cannot be integrated on a single chip. They are, instead, discrete microsystems. Micromachining of silicon substrate has been applied to miniature optical bench and integrated optical systems since the 1970's. See K. E. Petersen, "*Silicon as a Mechanical Material*," Proc. IEEE, Vol. 70, No. 5, at 420–57 (1982). Silicon V-grooves in crystalline wafers have been employed in many products for aligning optical fibers. Torsional mirrors have been used in digital micro-mirror devices for projection displays.

Micromachining allows an inexpensive and reproducible batch processing of optical components. However, to date, most of the micro-optical components and systems are designed for optical access normal to the substrate surface because the microfabricated optical elements are confined to and within the surface of the substrate. Such examples include digital micro-mirrors as described by L. J. Hornbeck, "*Deformable-Mirror Spatial Light Modulators*," Proc. SPIE, Vol. 1150, pp 86–102 (1990), and microfabricated optical choppers, M. T. Ching et al., "*Microfabricated Optical Chopper*," Proc. SPIE, Vol. 1992 at 40–46 (1993). Since external optics is needed for optical systems using components restricted within the substrate surface, monolithic integration of the complete optical system on a single chip is not possible with these technologies.

Monolithic integration of a whole optical system or a micro-optical system, drastically reduces its size, weight and cost. Furthermore, expensive packaging process of individual optical components is totally eliminated. One key component for a monolithic micro-optical system is an out of plane optical element, that is optical elements which are not confined to the surface of the substrate. In particular, vertical optical components standing perpendicularly to the surface allow multiple elements to be cascaded along the optical axis on the substrate. The LIGA process can produce tall structures with a height of several hundred micrometers and can be used to fabricate optical elements, although X-ray lithography is required to do so. However, it is very difficult to create patterns on the sidewalls of the tall structures fabricated by LIGA methodologies. These patterns will perform optical functions such as lenses or gratings.

More recently, a micro-hinged technology has been developed which allows three-dimensional structures to be assembled from thin plates on the surface of the substrate. See K. S. J. Pister et al., "Microfabricated Hinges," Sensors and Actuators A, Vol. 33, at 249–56 (1992). This technology is based on surface micromachining and is compatible with most micro-actuator fabrication processes.

Three-dimensional micro-optics fabricated by surface micromachining opens a new area for integrated optics in free-space. Using this technology, integrated micro-optical elements can be patterned by conventional photolithography and etching techniques and then made to stand perpendicular to the substrate. Thus, multiple free-space optic elements along the optical path can be made on the same substrate. The substrate serves as a micro-optical bench and lenses, mirrors and other components are prealigned by photolithography and then constructed by microfabrication. Micro-Fresnel lenses, standing perpendicular to the substrate, have been fabricated, micro-mirrors, gratings, beam splitters and lens mounts have also been demonstrated. The microfabrication technique is compatible with microactuators and the integration of a vertical mirror with a rotational stage has been demonstrated. Using surface micromachined free-space structures thus presents yet unrealized opportunities for the fabrication of optical systems.

Currently, optical data storage on compact disks, laser disks, and magento-optic disks as well as other optical medium, is emerging as the most promising technology for mass digital storage with removable storage media. However, in each of these systems, an optical pickup head is necessary to read or write onto the disk, which typically has either been fabricated from discrete components or from guided wave technology, and is comprised of a mixture of micromachined and discrete elements. Assembly of the discrete elements with a high degree of alignment accuracy generally requires a substantial amount of labor and time. The lack of batch fabrication processes and the cost of such systems has been a bottleneck in the low-cost, high-yield fabrication of mass optical storage systems. In addition, the weight of the pickup head also plays a key role in the data access rate of the optical storage system. It has been shown that the data access rate is inversely proportional to the square root of the mass of the pickup head. Pickup heads consisting of individually packaged discrete elements tend to be much heavier due to the extra mass of the packages and assembly.

The previous attempts of integrating optical pickup heads using guided wave technology suffers from high coupling losses and difficulty in making high performance lenses. Another approach uses diffractive planar micro-optics, which somewhat relieves this constraint, however, the coupling of the source diode laser is difficult. This approach is also susceptible to higher optical crosstalk as light is confined to the slab and high order diffracted beams become a source of crosstalk. See T. Shiono et al., "*Planer-Optic-Disk Pickup with Diffractive Micro-optics*," Applied Optics, Vol. 33, at 73–50, (1986).

Therefore, what is needed is some type of optical pickup system which may be utilized with optical data storage which is a true free-space optical system that has the benefits of conventional pickup heads with discrete free-space optical elements, but which is not limited by the cost, size and difficulty of fabrication and performance limitations characteristic of the prior art technologies, but which should be manufacturable at low cost in large numbers with high yields, and would improve the optical and system performance of the optical storage system.

BRIEF SUMMARY OF THE INVENTION

The invention is an optical pickup head for use with an optical disk. The invention comprises a semiconductor substrate, and a light source disposed on the substrate and extending thereabove to generate a light beam on an optical axis in free-space. Typically, the light source is a semiconductor laser. A collimating lens is surface micromachined from the substrate and vertically extended from the substrate into the optical axis for receiving the light beam and for producing a collimated light beam along the optical axis. A beam splitter is surfaced micromachined from the substrate and extended thereabove into the optical axis for selectively reflecting a return beam on the optical axis from the optical disk. A focusing lens is surface micromachined from the substrate for focusing the light beam onto the optical disk, for receiving from the optical disk a reflected beam, and for directing the reflected beam to the beam splitter. A photodetector to which the reflected beam from the optical disk is directed by means in part by the beam splitter so that information on the optical disk is detected is defined in the substrate. As a result, a single chip optical pickup head is economically fabricated.

The collimating lens, beam splitter and focusing lens are hinged, surface-micromachined devices rotated out of the substrate to extend vertically thereabove.

The optical pickup head further comprises a surface-micromachined inclined mirror disposed in the optical axis to receive a focused light beam from the focusing lens and to direct the focused light beam in a predetermined direction onto the optical disk.

The optical pickup head still further comprises a surface-micromachined mirror disposed in a reflected return optical beam from the beam splitter to direct the optical beam into the photodetector.

In another embodiment the focusing lens is an inclined reflecting lens to simultaneously focus and redirect the light beam on the optical axis to the optical disk.

In one embodiment the optical pickup head further comprises a surface-micromachined rotatable stage. The beam splitter is disposed on the rotatable stage so that direction of the return beam selectively reflected by the beam splitter is variably adjustable.

In yet another embodiment the optical pickup head further comprises a surface-micromachined translational table and a surface-micromachined comb drive or other known actuators connected thereto. The focusing lens is surface micromachined on the translational table thereby permitting variable focal distance on the disks.

In one embodiment the optical pickup head further comprises at least one surface-micromachined, hinged alignment plate having an asymmetric notch defined therein. The alignment plate is inclined for mechanical alignment with the light source. The light source is disposed in the asymmetric notch and aligned thereby to the optical axis.

In the illustrated embodiment the collimating lens and focusing lens are surface-micromachined Fresnel lenses, but should be understood to also include surface-micromachined diffractive optical elements including holographic lenses.

The optical pickup head may further comprise a second optical pickup head so that where the optical disk is a double-layer digital video disk, the optical pickup head and second pickup head independently read the double-layer digital video disk. The concept can be extended to multilayer disks with more than two layers, since the area occupied by each head is much smaller compared to conventional heads. Multiple heads sharing the same semiconductor laser source can also be made.

The optical disk can be a read-only or a read-write optical disk. In the latter case the pickup head further comprises control circuitry defined in the substrate to selectively operate the light source as a write-light source to write digital data into the read-write optical disk.

The optical pickup head of the invention is of particularly utility where the optical disk is a reloadable compact disk, because of the small size and low mass of the pickup head.

The invention is also defined as an improvement in a micro-optical disk pickup head having a light source generating a light beam received by a collimating lens, which directs a collimated beam onto a beam splitter and thence to a focusing lens from whence the light beam is directed to an optical data storage disk. Light returned from the optical data storage disk is modified by information stored or storable on the disk and is returned to focusing lens and thence to the beam splitter to be directed to a photodetector by which data on the optical data storage disk is detected. The improvement is the fabrication of the collimating lens, beam splitter and focusing lens as hinged, surface-micromachined optical elements fabricated in two polysilicon layers on the substrate and erected above the substrate by means of surface micromachined hinges. The optical elements are held erect from the substrate at least by a surface-micromachined spring latch for each optical element to define a free-space optical axis above the substrate upon which the light beam is transmitted from the light source to the optical data storage disk and reflected back therefrom to the photodetector.

The improvement contemplates that at least one of the optical elements includes a surface-micromachined linear venier, and that at least one of the optical elements includes a surface-micromachined rotary table.

The improvement includes the situation where the light source includes a passive alignment mount for aligning the light source with respect to the free-space optical axis.

More generally the invention is an optical pickup head for electro-optical communication with an optical data storage disk comprising a plurality of optical elements for transforming an electrical signal into an optical signal and directing the optical signal onto the optical storage disk, for receiving a reflected optical signal from the optical storage disk, and retransforming the reflected optical signal into an electrical signal indicative of information stored on the optical storage disk. Each of the plurality of optical elements are hinged, surface-micromachined optical elements fabricated from a semiconductor substrate and disposed vertically thereabove to define an optical axis in free-space along which the light generated by the light source is transmitted and reflected. As a result, a low cost, light weight,high speed optical head is provided.

The invention may now be better visualized by turning to the following drawings wherein like elements are referenced by like numerals.

BRIEF DESCRIPTION OF THE DRAWINGS

FIG. 1 is a diagrammatic depiction of a free-space optical bench having an optical pickup head for reading and writing onto an optical data disk.

Figure 5:
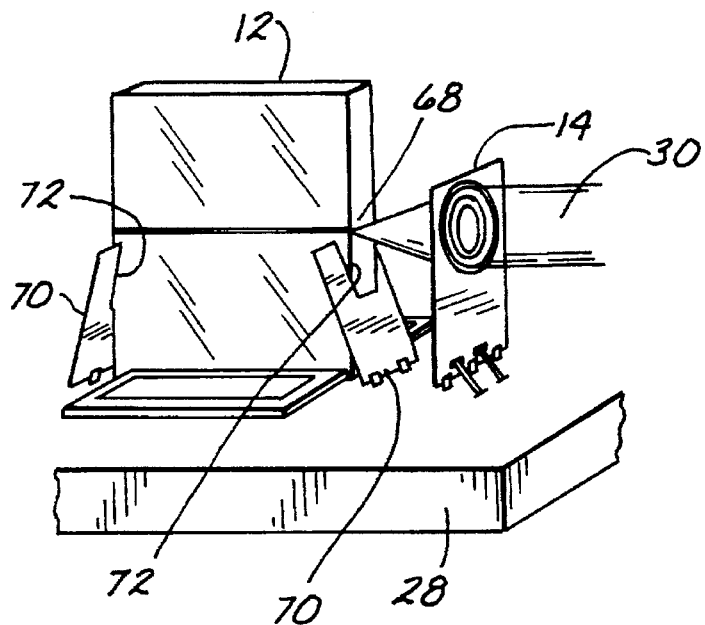
FIG. 5 is a side perspective view of a self-aligned hybrid edge-emitting laser combined with a Fresnel lens as used in the free-space system of FIG. 1.

The invention and its various embodiments can now be better understood by turning to the following detailed description.

DETAILED DESCRIPTION OF THE PREFERRED EMBODIMENTS

The optical pickup head used on the optical disk plays a key role in the performance and cost of optical data storage systems, including CD-ROM, compact disk (CD), and the immerging super high-density video disk (DVD). Integration of the pickup head on a single substrate not only significantly reduces the expensive assembly processes of bulk optical components, but also greatly increases the data transfer rate, a feature particularly desirable for computer and multimedia applications, including CD-ROM where reloadable disks must be accommodated. The performance improvement stems from large weight reduction resulting from the integration. Since the pickup heads are placed on actuators controlled by feedback loops to keep track of focusing, lighter heads allow the actuator to move at higher rates with higher reliability of tracking.

The invention of the illustrated embodiment is a free-space optical system. Three-dimensional passive optical elements, such as lenses and beam splitters, as well as active optical electrical components, such as photodiodes, are fabricated monolithically on a silicon substrate by surface micromachining techniques, which will be illustrated generally below in FIGS. 2a–d. The integration scheme can be extended to included electronic control and sensing circuits by combining the micromachining process with standard VLSI processing.

A passive self-alignment scheme for integration of a semiconductor laser source allows the entire optical pickup head to be integrated on a chip within an area of approximately a few millimeters square as illustrated below in connection with FIG. 5.

FIG. 1 is a highly idealized depiction of the integrated optical disk pickup head of the invention using free-space integrated optics realized by surface micromachining fabrication techniques. The pickup head, generally denoted by reference numeral 10, inclues a passively self-aligned semiconductor laser 12, a surface-micromachined collimating micro-Fresnel lens 14 on a lineal translational table, a surface-micromachined rotatable beam splitter 16, a surface-micromachined focusing micro-Fresnel lens 18, inclined surface-micromachined mirrors 20 and 22 and an integrated photodetector 24 used to read or write from a conventional optical disk 26. Each of the optical elements are mounted on or surface micromachined from substrate 28. Additional integrated circuits 25 may be fabricated by conventional methods in semiconductor substrate 28 and coupled to laser 12, photodetector 24 and other processing or input/output circuits or buses.

Light from laser 12 propagates in free-space between the optical elements of pickup head 10. Each of the elements of FIG. 1 are mounted on top of a silicon substrate 28 and extend above and out of the plane top surface of substrate 28. Elements 14–22 are fabricated using a micro-optical bench technology which is generally described in L. Y. Lin et al., "*Micromachined Three-Dimensional Micro-optics for Integrated Free-Space Optical System,*" IEEE Photonics Tech. Lett., Vol. 6, No. 12, at 1445–47, (1994); and S. S. Lee et al., "*An 8×1 Micromachined Micro-Fresnel Lens Array for Free-Space Optical Interconnect,*" IEEE Lasers and Electro-Optic Society, 1994 Annual Meeting, Boston, Mass., Oct. 31–Nov. 3, 1994, which is incorporated herein by reference. Three-dimensional micro-Fresnel lenses, mirrors, gratings and beam splitters, standing perpendicularly from the substrate from which they have been fabricated, all have been recently successfully demonstrated and reported in the literature. Furthermore, actuators such as comb drives and micromotors as well as micromachined translational stages and rotary stages can be incorporated as needed into the micro-optical bench of FIG. 1 using the same fabrication processes. Using these available building blocks, it is practical to construct a fully integrated single chip optical pickup head 10 that includes optics, feedback electronics as well as on-chip actuators.

Turning specifically again to FIG. 1, optical pickup head 10 has an optical axis 30 approximately 250 microns above the surface of silicon substrate 28. Light from laser 12 is collimated by micro-Fresnel lens 14 and transmitted through beam splitter 16 to a focusing Fresnel lens 18. Focusing Fresnel lens 18 focuses the laser light on a 45-degree inclined mirror 20 from whence it is reflected upward to a rotating optical disk 26 onto a read-write spot 32.

In the read mode, light is reflected from optical disk 26 back to mirror 20 and onto focusing micro-Fresnel lens 18. The reflected light is transmitted back along optical axis 30 to beam splitter 16 from whence it is reflected at least in part to inclined mirror 22. Mirror 22 is a 45-degree mirror, which then reflects return light from optical disk 26 to an integrated photodetector 24 within substrate 28. Photodetector 24 is connected with conventional detect and processing circuitry by which means data from optical disk 26 is read. Although a single photodetector 24 has been illustrated in the embodiment of FIG. 1, it expressly contemplated that multiple-segment photodetectors such as quadrant detectors may be incorporated into the optical system to simultaneously detect focusing and tracking error signals according to conventional principles and optical pickup head design.

Further, although the illustrated embodiment shows a focusing lens 18 and a separate reflecting mirror 20, lens 18 and mirror 20 may be combined into a single element comprised of an inclined reflecting lens. In this instance, focusing lens 18 would be eliminated and mirror 20 replaced by an inclined Fresnel reflecting lens, which would received the collimated light beam on optical axis 30 and simultaneously reflect and focus it to the read-write spot 33 on optical disk 26.

The free-space integrated optical disk pickup head 10 of FIG. 1 is fabricated using microhinged technology with a two-layer polysilicon process as described by K. S. J. Pister, supra, which is incorporated herein by reference. FIGS. 2a–d illustrate the vertical free-space hinge micro-optical fabrication technique. The optical elements, such as lenses and mirrors, are made on the polysilicon plates 52 which are laid out on the polysilicon layers disposed on substrate 28. These plates are fabricated so they are free to rotate around bottom microhinges 38.

Figure 2A:
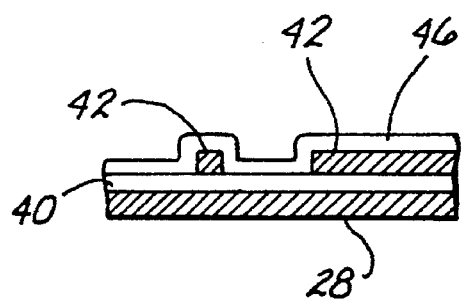
FIGS. 2a–2d are simplified cross-sectional views illustrated to two layer polysilicon surface micromachining technique generally used to fabricate the optical elements depicted in FIG. 1.
Figure 2B:
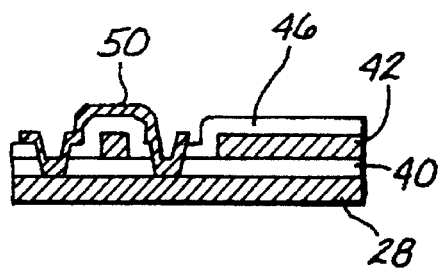

As shown beginning in FIG. 2a, hinges 38 are fabricated by disposing a 2-micron-thick phosphosilicate glass layer 40 on substrate 28. A first polysilicon layer 42 of 2-micron thickness is then disposed on top of sacrificial glass layer 40 and patterned using conventional photolithographic techniques. Various optical elements such as Fresnel lenses, mirrors, beam splitters and gratings are made in polysilicon layer 42 according to design considerations known in the art using photolithography and dry etching. The hinge pins 44 are also defined in layer 42 as shown in the left end of FIG. 2a.

Figure 2C:
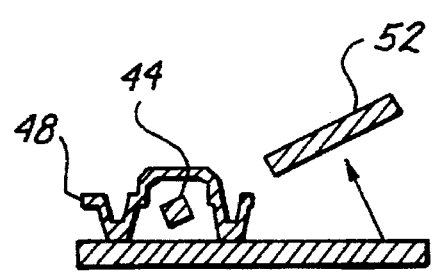

Following the deposition and patterning of layer 42, another layer 46 of sacrificial phosphosilicate glass is disposed on layer 42 and on or in exposed portions of layer 40. The second sacrificial layer 46 is typically 0.5 micron thick. The supporting structures such as staple 48 as shown in FIG. 2c, spring latches 54 described in FIG. 3 and the like are then patterned and defined in a second polysilicon layer 50 as depicted in FIG. 2b, again using conventional photolithographic and dry etching techniques. The base of staples and torsion springs are fixed to silicon substrate 28 by opening contact holes through both sacrificial layers 40 and 46 before deposition of a second polysilicon layer 50. Structures made in the second polysilicon layer 50 can also be fixed to the first polysilicon layer 42 by etching contact holes only through sacrificial layer 46, as is required when making rotatable mirror mounts as described below in connection with FIG. 4.

The optical elements patterned in first polysilicon layer 42 are released from substrate 28 by selectively removing the sacrificial layers 40 and 46. After the release etching, the plate 52 as shown in FIGS. 2c–d with the micro-optical patterns formed thereon, is free to rotate around hinge pin 44 included within staple 48.

Figure 3:
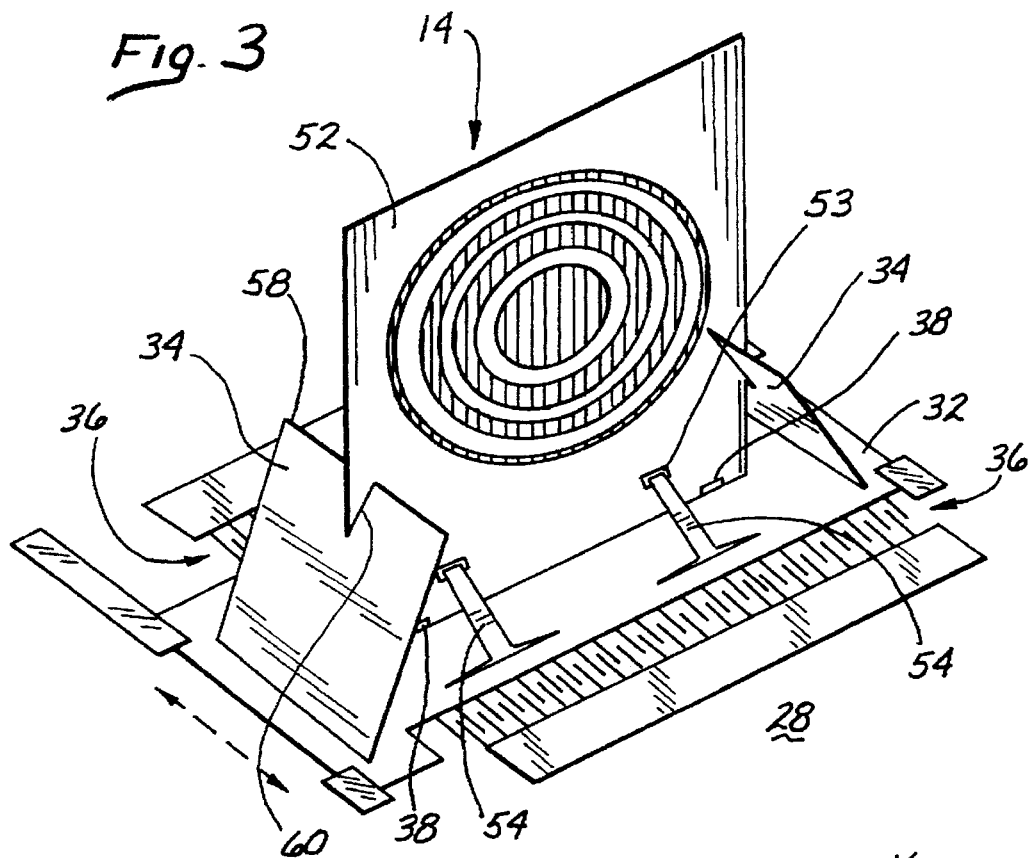
FIG. 3 is a perspective in enlarged scale of a Fresnel lens with a linear translational table driven by a comb drive.

When plate 52 is lifted up, the top portion of spring latches 54, as shown in FIG. 3, will slide into a slot 53 defined within plate 52 and snap into the narrower part of slot 53, thereby preventing further motion of the plates. The torsion spring constant connecting spring latch 54 to the substrate creates a spring force which tends to force the spring latch 54 back to substrate 28, thereby locking plate 52 in place. The length of spring latch 54 defines the angle between plate 52 and substrate 28 which is approximately 90 degrees.

Figure 2D:
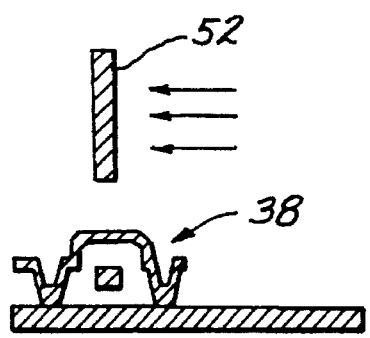

After the three-dimensional optical plate 52 is erected or assembled, a layer of gold is coated on the lifted polysilicon surfaces as schematically depicted in FIG. 2d. For a Fresnel zone plate or micro-mirror, a thick layer of gold is coated to completely block the light passing through the dark zones or to make a perfectly reflecting mirror. Thinner gold layers are used for partially transmitting mirrors or beam splitters.

Because spring latch 54 may not be able to precisely determine the angle orientation of plate 52, particularly when the height of plate 52 is large compared to the length of spring latch 54, Fresnel lens of FIG. 3 has incorporated a lens mount to precisely define the angles of the three-dimensional optical elements. The lens mount is comprised of two folded polysilicon plates 34 similar to plate 52, but folding in a direction orthogonal to plate 52. Polysilicon plates 34 have a V-shaped opening 56 at the top edge 58 of plate 34 to guide lens plate 52 into a 2-micron Y-groove 60 in the center of polysilicon plate 34. Thus, the latches of the mount are folded from two sides of plate 52 and can be made as tall as plate 52 itself. Therefore, the angle defined by the lens mount is much more precise than is achievable simply through the means of spring latch 54. The lens mount also greatly improves the mechanical strength and stability of the micro-optical elements.

One unique advantage of using a surface micromachine to implement micro-optical bench structures is that micropositioners or microactuators can be monolithically integrated using the same fabrication processes. This allows the fine adjustments in addition to course adjustments which are normally achieved at the design stage using computer assisted design layout tools. Using similar structures to micromotors as described by L. S. Fan et al., *"IC-Processed Electrostatic Micromotors,"* Sensors and Actuators, Vol. 20, at 41–47, (1989), incorporated herein by reference, rotational stages and linear micropositioners can be realized if desired.

Figure 4:
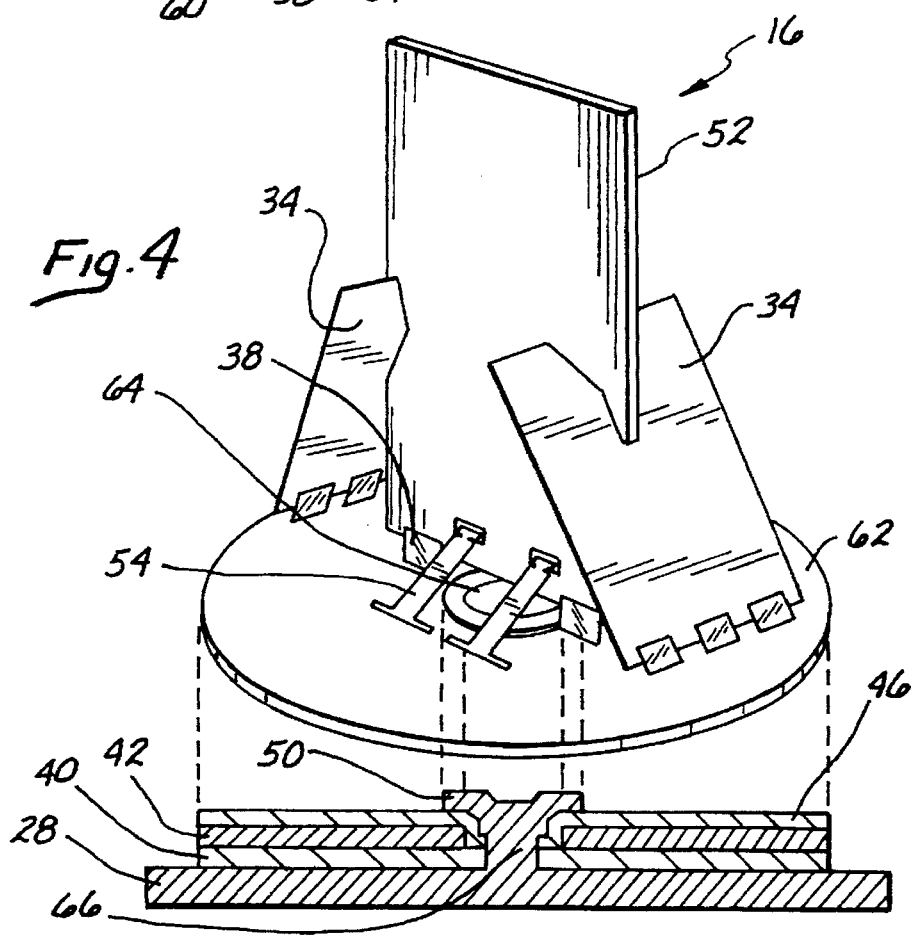
FIG. 4 is a simplified cross-sectional view with a projected perspective view of a micro-mirror on a rotational table manufactured using the two layer polysilicon surface micromachining technique generally described in connection with FIGS. 2a–d.

FIG. 4 illustrates in simplified cross-sectional view which is projected onto a perspective view how this is accomplished in a rotatable mirror or beam splitter 16 as shown in FIG. 4. The same two-layer polysilicon method as described in connection with FIGS. 2a–d is exploited to fabricate the rotational stage shown in FIG. 4. Rotatable plate 62 is fabricated in first polysilicon layer 42. Axis 64 and its underlying hub 66 are defined in second polysilicon layer 50. The second polysilicon layer spring latches and staples are now coupled to first polysilicon layer 42 and rotatable plate 62 as depicted in the projected perspective portion of FIG. 4. After the sacrificial layers 46 and 40 have been removed, first polysilicon layer 42 from which turntable 62 has been comprised, is free to rotate on the substrate plane. Microhinges 38 are defined on the rotating first polysilicon plate 42. The bottom of the second polysilicon optics plate 52 is connected to microhinges 38 defined from first polysilicon layer 42. A translational table 32 as shown in FIG. 3 is made in a similar manner.

Although the embodiment of FIG. 1 has been shown with a rotatable beam-splitter 16, it is also within the scope of the invention that beam splitter 16 may be fabricated at a predetermined fixed angle since the need for rotational adjustment can be eliminated by careful photolithographic layout.

On-chip alignment of laser source 12 can be achieved by placing collimating lens 14 on a lateral translational table 32 driven by a comb drive 36. FIG. 3 is an idealized perspective view of Fresnel lens 14 erected on a moveable stage 32 fabricated into substrate 28. Lens 14 is held upright by spring latches 54 in a manner similar described by L. Y. Lin et al., *"Three-Dimensional Micro-Fresnel Optical Elements Fabricated by a Micromachining Technique,"* Electronics Letters, Vol. 30, No. 5, at 448–49, (1994), which is incorporated herein by reference. Translation table 32 is coupled to an electrostatic comb drive, generally denoted by reference numeral 36.

A free-space micro-optical bench also enables a large optical system to be monolithically integrated on a small silicon chip. Active optical components such as semiconductor lasers, light emitting diodes and photodetectors are needed in most optical systems. It is therefore desirable to integrate these active devices on the micro-optical bench. Hybrid integration is necessary for active devices that cannot be made by silicon micromachining, such as lasers. Unlike the conventional silicon optical bench technology where waveguides are used to connect various optical devices, the micro-optical bench integrated devices with vertical, three-dimensional micro-optical components are mounted and communicate in free-space. Alignment structures for the micro-optical discrete components are fabricated in the silicon substrate using micromachining techniques.

Consider, for example, the three-dimensional self-alignment structure for integrating active optical components such as semiconductor lasers or isolators on the micro-optical bench. In order to integrate the micro-optical bench with active optical devices such as semiconductor lasers, a self-aligning technique is used as illustrated in FIG. 5 in the context of aligning an edge-emitting semiconductor laser 12 with a micro-Fresnel lens 14. Edge-emitting laser 12 is mounted on its side for accurate positioning of active emitting spot 68. Many other possible schemes for mounting semiconductor lasers may be used including upright mounting and flip-chip mounting. Since the thickness of a lapped laser substrate usually has a tolerance of about five microns, upright mounting is not considered ideal for a micro-optical bench without employing additional adjustable optics. Flip-chip mounting has an alignment accuracy of about 1 micron. However, emitting spot 68 is very close to silicon surface and is much lower than what is normally desired in a free-space optical system. Since the laser chip size can be precisely defined by scribing, side mounting places emitting spot 68 accurately on optical axis 30, which is about 254 microns above silicon substrate 28. See, Lin et.al., Applied Physics Letters, May 29, 1995, incorporated herein by reference.

Two alignment plates 70 are micromachined and erected at the front and back edges of laser 12 as shown in FIG. 5. Alignment plate 70 is fabricated at the same time as is microlens 14. The asymmetric wedge-shaped opening 72 in alignment plates 70 gradually guides the active side or junction side of laser 12 toward the flat edge of wedge opening 72 and away from the opposing slanted edge. This design allows lasers having a variation in thickness from 100 microns to 140 microns to be easily accommodated. The height of alignment plates 70 thus permit more accurate alignment. After assembly, laser 12 is electrically contacted using silver epoxy, or contacted through an indium mount or flipped-up indium-covered contact plate. Though the side-mounting scheme is shown in the illustrated embodiment, the optical pickup head described can also be incorporated in other mounting schemes.

Therefore, what is described is a free-space integrated optical disk pickup head fabricated using surface micromachined techniques in which three-dimensional optical elements, translational rotary stages and on-chip comb drive actuators are also monolithically integrated. The technology is particularly adapted for mass production of fully integrated single chip optical disk drives.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, a plurality of focusing lenses and corresponding plurality of detectors could be used with a single laser source or with a corresponding plurality of sources in any combination desired to separately focus a plurality of beams onto a plurality of data storage layers in a multilayered optical disk. The exact identity and nature of the optical elements used in the surface-micromachined optical bench to comprise the optical pickup head is described illustratively only and any elements or combination of elements now known or later devised could be employed without departing from the spirit of the invention, which in general encompasses any kind of a surface-micromachined optical pickup head.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An optical pickup head for use with an optical disk comprising:

a semiconductor substrate;

a light source disposed on said substrate and extending thereabove to generate a light beam on an optical axis in free-space;

a collimating lens having a hinge, which is surface micromachined from said substrate and vertically extended from said substrate by rotation about said hinge into said optical axis for receiving said light beam and producing a collimated light beam along said optical axis;

a beam splitter with a hinge which is surfaced micromachined from said substrate and extended thereabove by rotation about said hinge into said optical axis for selectively reflecting a return beam on said optical axis from said optical disk;

a focusing lens with a hinge which is surface micromachined from said substrate and rotated about said hinge into said optical axis for focusing said light beam onto said optical disk, for receiving from said optical disk a reflected beam, and for directing said reflected beam to said beam splitter; and a photodetector to which said reflected beam from said optical disk is directed by means in part by said beam splitter so that information on said optical disk is detected, whereby a single chip optical pickup head is economically fabricated.

2. The optical pickup head of claim 1 further comprising a surface-micromachined mirror with a hinge disposed in a reflected return optical beam from said beam splitter by rotation about said hinge to direct said optical beam into said photodetector.

3. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and a surface-micromachined inclined mirror disposed in said optical axis to receive a focused light beam from said focusing lens and to direct said focused light beam in a predetermined direction onto said optical disk, whereby a single chip optical pickup head is economically fabricated.

4. The optical pickup head of claim 3 further comprising a surface-micromachined mirror with a hinge disposed by rotation about said hinge in a reflected return optical beam from said beam splitter to direct said optical beam into said photodetector.

5. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter; and a photodetector to which said reflected beam from said optical disk is directed by means in part by said beam splitter so that information on said optical disk is detected, wherein said collimating lens, beam splitter and focusing lens are hinged, surface-micromachined devices rotated out of said substrate to extend vertically thereabove, whereby a single chip optical pickup head is economically fabricated.

6. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and wherein said focusing lens is an inclined reflecting lens to simultaneously focus and redirect said light beam on said optical axis to said optical disk, whereby a single chip optical pickup head is economically fabricated.

7. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along, said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and a surface-micromachined rotatable stage, said beam splitter being disposed on said rotatable stage so that direction of said return beam selectively reflected by said beam splitter is variably adjustable, whereby a single chip optical pickup head is economically fabricated.

8. The optical pickup head of claim 7 further comprising a surface-micromachined translational table and a surface-micromachined comb drive connected thereto, said collimating lens being surface micromachined on said translational table thereby permitting variable alignment with said light source.

9. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and a surface-micromachined translational table and a surface-micromachined comb drive connected thereto, said collimating lens being surface micromachined on said translational table thereby permitting variable alignment with said light source, whereby a single chip optical pickup head is economically fabricated.

10. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and at least one surface-micromachined hinged alignment plate having an asymmetric notch defined therein, said alignment plate being inclined for mechanical alignment with said light source, said light source being disposed in said asymmetric notch and aligned thereby to said optical axis, whereby a single chip optical pickup head is economically fabricated.

11. A micro-optical bench comprising:

a semiconductor substrate;

a plurality of surface-micromachined optical elements fabricated from said substrate and extending vertically thereabove defining in combination a free-space optical path above said substrate; and means for aligning at least one of said plurality of surface-micromachined optical elements to said free-space optical path, whereby said micro-optical bench is economically fabricated.

12. A micro-optical bench comprising:

a semiconductor substrate; and a plurality of surface-micromachined optical elements fabricated from said substrate and extending vertically thereabove defining in combination a free-space optical path above said substrate, wherein at least one of said plurality of surface-micromachined optical elements is a focusing element rotated out of said substrate to extend vertically thereabove into said free-space optical path, and further comprising means for translating said focusing element to provide for variable focus, whereby said micro-optical bench is economically fabricated.

13. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and a second optical pickup head and wherein said optical disk is a double digital video disk said optical pickup head and second pickup head independently reading said double digital video disk, whereby a single chip optical pickup head is economically fabricated.

14. An optical pickup head for use with an optical disk comprising:

a semiconductor substrate;

a light source disposed on said substrate and extending thereabove to generate a light beam on an optical axis in free-space;

a collimating lens which is surface micromachined from said substrate and vertically extended from said substrate into said optical axis for receiving said light beam and producing a collimated light beam along said optical axis;

a beam splitter which is surfaced micromachined from said substrate and extended thereabove into said optical axis for selectively reflecting a return beam on said optical axis from said optical disk;

a focusing lens which is surface micromachined from said substrate for focusing said light beam onto said optical disk, for receiving from said optical disk a reflected beam, and for directing said reflected beam to said beam splitter;

a photodetector to which said reflected beam from said optical disk is directed by means in part by said beam splitter so that information on said optical disk is detected; and wherein said optical disk is a read-write optical disk and further comprising control circuitry defined in said substrate to selectively operate said light source as a write-light source to write digital data into said read-write optical disk, whereby a single chip optical pickup head is economically fabricated.

15. A micro-optical bench comprising:

a semiconductor substrate; and a plurality of surface-micromachined optical elements fabricated from said substrate and extending vertically thereabove defining in combination a free-space optical path above said substrate, wherein at least one of said plurality of surface-micromachined optical elements is a hinged, surface-micromachined devices rotated out of said substrate to extend vertically thereabove, whereby said micro-optical bench is economically fabricated.

16. An improvement in a micro-optical disk pickup head having a light source generating a light beam received by a collimating lens which directs a collimated beam onto a beam splitter and thence to a focusing lens from whence said light beam is directed to an optical data storage disk, light returned from said optical data storage disk being modified by information stored or storable on said disk and returned to focusing lens and thence to said beam splitter to be directed to a photodetector by which data on said optical data storage disk is detected, said improvement comprising:

at least one of said collimating lens, beam splitter and focusing lens fabricated as hinged, surface-micromachined optical elements fabricated in two polysilicon layers on said substrate and erected above said substrate by means of surface micromachined hinges and being held erect from said substrate at least by a surface-micromachined spring latch for each optical element to define a free-space optical axis above said substrate upon which said light beam is transmitted from said light source to said optical data storage disk and reflected back therefrom to said photodetector.

17. The improvement of claim 16 wherein at least one of said optical elements includes a surface-micromachined linear venier.

18. The improvement of claim 16 wherein at least one of said optical elements includes a surface-micromachined rotary table.

19. The improvement of claim 16 wherein said light source includes a passive alignment mount for aligning said light source with respect to said free-space optical axis.

20. An optical pickup head for electro-optical communication with an optical data storage disk comprising:

a plurality of optical elements for transforming an electrical signal into an optical signal and directing said optical signal onto said optical storage disk, for receiving a reflected optical signal from said optical storage disk, and for retransforming said reflected optical signal into an electrical signal indicative of information stored on said optical storage disk, wherein at least one of said plurality of optical elements are hinged, surface-micromachined optical elements fabricated from a semiconductor substrate and disposed vertically thereabove to define an optical axis in free-space along which said light generated by said light source is transmitted and reflected, whereby a low cost, light weight, high speed optical head is provided.

21. A micro-optical bench comprising:

a semiconductor substrate; and a plurality of surface-micromachined optical elements fabricated from said substrate and each having a hinge, and each extending vertically thereabove by rotation about said corresponding hinge defining in combination a free-space optical path above said substrate, whereby said micro-optical bench is economically fabricated.

* * * * *